United States Patent [19]

Weissenberger

[11] Patent Number: 4,484,832
[45] Date of Patent: Nov. 27, 1984

[54] CONNECTION COUPLING FOR THE RELEASABLE ATTACHMENT OF AN END OF A FIRST ROD WITH A SECOND ROD

[75] Inventor: Heinz Weissenberger, Klettgau-Weisweil, Fed. Rep. of Germany

[73] Assignee: Gebrüder Pletscher, Marthalen, Switzerland

[21] Appl. No.: 412,250

[22] Filed: Aug. 27, 1982

[30] Foreign Application Priority Data

Sep. 15, 1981 [CH] Switzerland ............... 5980/81

[51] Int. Cl.³ ............................... F16B 7/08
[52] U.S. Cl. ............................ 403/191; 403/192; 403/233; 403/205; 403/364; 403/403; 280/281 R
[58] Field of Search ............ 403/191, 192, 233, 235, 403/237, 205, 403, 364, 71, 70, 69; 280/281 R

[56] References Cited

U.S. PATENT DOCUMENTS 3,401,960 9/1968 Saunders ............... 403/206
3,633,250 1/1972 Russel ............... 403/233 X

FOREIGN PATENT DOCUMENTS 1577315 10/1980 United Kingdom ........... 403/237

Primary Examiner—Cornelius J. Husar
Assistant Examiner—Joseph A. Fischetti
Attorney, Agent, or Firm—Werner W. Kleeman

[57] ABSTRACT

A connection coupling or socket arrangement contains two coupling parts each possessing a bore and arranged at an angle with respect to one another. In order to be able to interconnect rods or the like with one another, without the use of further components, the one coupling part serving for receiving one of the rods is continuously lengthwise slotted over the length of its bore. The end regions of this one coupling part bounding at such lengthwise or longitudinal slot each carry a respective portion or section of the other coupling part which is divided into such two portions or sections transversely with respect to its bore. These portions are subjected to the action of a resilient or spring force which strives to mutually shift both of these portions with respect to one another transversely in relation to its bore. The connection coupling is suitable for the attachment or connection of rods or bars, which may be solid profile elements or tubular elements, having small transverse dimensions, and, in particular, such connection coupling is particularly suitable for the attachment of support struts at one of the transverse struts forming a load-carrying surface of a luggage carrier.

11 Claims, 4 Drawing Figures

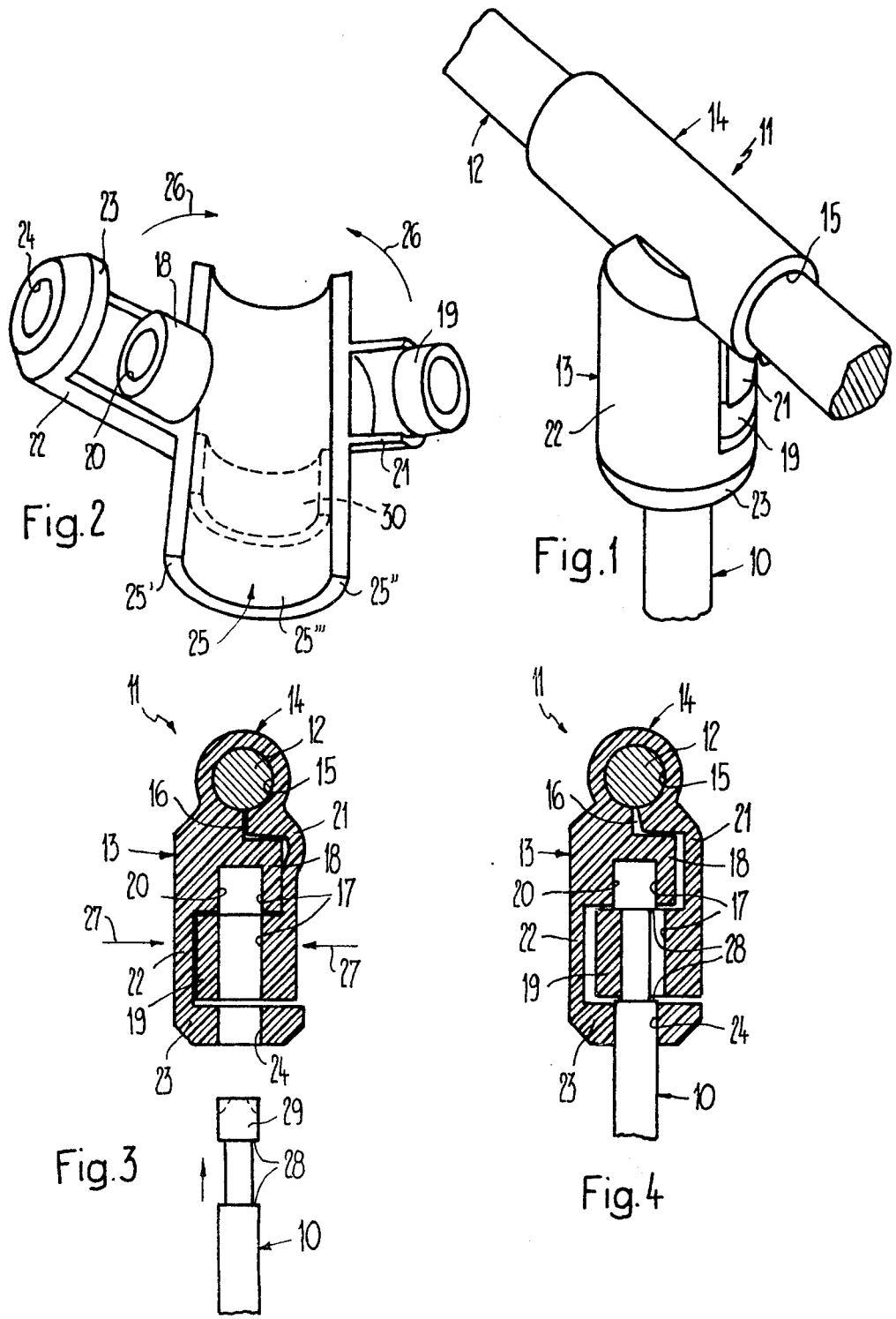

CONNECTION COUPLING FOR THE RELEASABLE ATTACHMENT OF AN END OF A FIRST ROD WITH A SECOND ROD

BACKGROUND OF THE INVENTION

The present invention relates to a new and improved construction of a connection coupling or socket arrangement for the releasable attachment or connection of an end of a first rod with a second rod.

Generally speaking, the connection coupling or socket arrangement of the present development is of the type containing two coupling parts, each of which is provided with a respective bore intended for receiving one of the rods or the like to be interconnected, these coupling parts being located at an angle with respect to one another.

In the context of this disclosure the term "rod" or "rod or bar member" is intended to mean a lengthwise extending element having essentially the same cross-section throughout its length. Therefore, in connection with the foregoing definition, and as used throughout this disclosure, there are to be understood that both solid profile shapes and also tubular elements are embraced by the terms rod or bar member or equivalent expressions.

With heretofore known constructions of connection couplings or socket arrangements of the aforementioned type the rods which are to be attached to one another are anchored at the related coupling part by means of special clamping elements, for instance clamping screws, or by pinning or pegging such rods in their related coupling part. The state-of-the-art connection couplings therefore are constructed to possess a number of parts and the attachment of the rods with one another requires correspondingly numerous operations or manipulations, and the frictional or form-locking connection, as the case may be, between the connection coupling on the one hand, and, the rod on the other hand, is limited to comparatively small locations or limited regions.

SUMMARY OF THE INVENTION

Therefore, with the foregoing in mind it is a primary object of the present invention to provide a new and improved construction of connection coupling for the positive releasable attachment or connection of two elements with one another in a manner not associated with the aforementioned drawbacks and limitations of the prior art connection couplings.

Another and more specific object of the present invention is directed to an improved connection coupling or socket arrangement for the releasable attachment of one end of a first rod with a second rod, wherein the connection coupling can be constructed as a one-part coupling, in fact can be formed of one-piece, and affords a reliable, at least force-locking or frictional attachment of the rods with one another.

Still a further significant object of the present invention is directed to a new and improved construction of connection coupling for interconnecting rod-like members with one another, which connection coupling is relatively simple in construction and design, extremely economical to manufacture, highly reliable in operation, easy to use, and permits relatively rapid and easy connection and release of the rod-like members with and from the connection coupling, while affording a positive and sturdy interconnection of the rod-like members with one another.

Now in order to implement these and still further objects of the invention, which will become more readily apparent as the description proceeds, the connection coupling or socket arrangement of the present development is manifested by the features that, the coupling part serving for the reception of the second rod is continuously longitudinally slotted throughout the length of its bore and at its end regions, bounding at the longitudinal or lengthwise slot, carries a respective portion of the other coupling part serving to receive the end of the first rod and subdivided transversely with respect to its bore into two portions or sections. These two portions or sections are exposed to the action of a spring or resilient force which strives to shift, relative to one another, both of these portions transversely with respect to the direction of extent of its bore.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective view of a connection coupling or socket arrangement according to the invention, depicting a pair of rods which are secured to one another by means of the depicted connection coupling;

FIG. 2 is a perspective view of the connection coupling depicted in FIG. 1 but showing the same prior to the assembly of the connection coupling and the interconnected mounting of the rods;

FIG. 3 is a cross-sectional view through the connection coupling of FIG. 1 during the assembly of the connection coupling and the mounting of the rods thereat and showing the end of the first rod which is to be inserted into the connection coupling; and FIG. 4 is a cross-sectional view through the connection coupling depicted in FIG. 1 in a sectional plane extending through the lengthwise axis of the first rod and at right angles to the lengthwise axis of the second rod.

DETAILED DESCRIPTION OF THE PREFERRED EMBODIMENTS

Describing now the drawings, there has been depicted therein an exemplary embodiment of a connection coupling or socket arrangement constructed according to the invention. In particular, by referring to FIG. 1 there will be seen a first rod or bar member 10 which is secured or connected at its there not particularly visible end to a second rod or bar member 12 by means of the inventive connection coupling or socket arrangement, generally designated in its entirety by reference numeral 11. As already mentioned, these rods 10 and 12 or the like can be solid profile sections, as has been illustrated, but also could be constituted by tubular elements. The connection coupling or socket arrangement 11 will be seen to comprise a coupling part or member 13 intended to receive the end of the first rod 10 when the connection coupling is in its assembled condition as well as a coupling part or member 14 extending approximately at right angles to the first mentioned coupling part or member 13.

This coupling part 14 possesses a continuous longitudinal or lengthwise bore 15, as particularly well seen by referring to FIGS. 3 and 4, and this longitudinal bore 15 serves for receiving the second rod 12. Moreover, the coupling part or member 14 is lengthwise slotted over its entire length and in a direction extending essentially parallel to the related bore 15 thereof. The linearly extending longitudinal or lengthwise slot, which is clearly visible in the illustration of FIGS. 3 and 4, has been conveniently designated by reference numeral 16.

As evident by referring to FIG. 3 in particular, the coupling part or member 13 possesses a bore 17 intended to receive the end of the first rod 10 and is divided, inclusive of the bore 17, into two coupling portions or sections 18 and 19 extending in a direction transversely with respect to the bore 17. The portion or section 18 is formed at the one end region of the coupling part or member 14 bounding one side edge of the lengthwise slot 16 and the other coupling portion or section 19 is formed at the other end region of the coupling part or member 14 bounding the other side edge of the lengthwise slot 16. The part of the bore 17 located in the portion or section 18 constitutes a blindhold bore 20. In the other portion or section 19 the related part of the bore 17 is continuous or open-ended. This coupling portion or section 19 is attached by means of a connection web 21 at the corresponding end region of the coupling part or member 14 bounding the aforementioned other side edge of the lengthwise slot 16. This connection web or portion 21 is elastically or resiliently bendable to a limited extent and laterally encloses or straddles, approximately over one half of its circumference, the coupling portion or section 18 in a bowl-like fashion, as best seen by also referring to FIG. 1.

At a further connection web or portion 22 formed at the coupling portion or section 18 and straddling or engaging in a bowl-like fashion the coupling portion or section 19 approximately over one-half of its circumference, there is formed a ring-shaped or annular portion 23 which axially engages over the portion 19. This annular or ring-shaped portion 23 has a bore 24 which essentially is in alignment with the blindhole bore 20 provided in the coupling portion or section 18.

From what has been previously explained and also from the shade lines shown in FIGS. 3 and 4, it will be apparent that the illustrated construction of connection coupling or socket arrangement 11 is formed of one-piece from a suitable plastics material.

FIG. 2 approximately illustrates the appearance of the connection coupling of the invention prior to its assembly and before the rods 10 and 12 have been interconnected as has been depicted in FIG. 1. That part of the connection coupling 11 which, following the assembly thereof, forms the coupling part or member 14 is constituted by an elongate or longitudinally extending bendable intermediate element or piece 25 having an approximately U-shaped cross-sectional configuration and which is bendable about bending axes extending essentially parallel to its lengthwise direction. This intermediate or central element 25 has marginal or end regions 25' and 25'' at which there are formed the coupling portions or sections 18 and 19, the coupling portion 19 being formed thereat by means of the connection web 21. These marginal or end regions 25' and 25'' possess a greater thickness than the intermediate or central region 25''' of the intermediate element 25. Consequently, it is possible for the intermediate region 25''' in particular to also be elastically elongated to a limited degree in the circumferential direction, and this elastic elongatability has particular significance when the connection coupling 11 is mounted or assembled, as will be more fully explained hereinafter.

If the intermediate element 25, depicted in FIG. 2, is wrapped about the rod 12 in the direction of the arrows 26 and if pressure is exerted in the direction of the arrows 27 upon the coupling portion or section 19 and the connection web 22, as shown in FIG. 3, then the part of the bore 17 provided in the coupling portion 19 is aligned with the blindhole bore 20 and the bore 24. At the same time the connection web 21 is elastically bent and/or the intermediate region 25''' of the intermediate element 25 is elastically elongated. The coupling portion 19 therefore strives to again laterally move out of the intermediate space between the coupling portion or section 18 and the ring-shaped or annular portion 23. The longitudinal or lengthwise slot 16 is almost closed. This position of the connection coupling 11 which is then capable of receiving the end of the rod 10 has been depicted in FIG. 3.

As also shown in the lower portion of the illustration of FIG. 3, at the end of the rod 10 there is machined an outwardly open continuous annular or ring-shaped groove 28, the width or height of which in the lengthwise direction of the rod 10 essentially corresponds to the length of the coupling portion 19. The actual end closure or termination of the rod 19 is therefore constituted by a head portion 29 which merges at the annular groove 28, as shown in FIG. 3. This head portion or head 29 has a diameter which corresponds essentially to that of the blindhole bore 20 and its length approximately corresponds to the depth of the blindhole bore 20 or exceeds such by a small amount.

In the position of the connection coupling 11 as has been depicted in FIG. 3, the end of the rod 10 which has been designed in the aforedescribed manner, can be inserted without any difficulty through the bore 24 into the bore 17 and up to the base of the blindhole bore 20. Now there is released the pressure which previously was exerted in the direction of the arrows 27, and, as a result, the coupling portion or section 19 is shifted laterally in relation to the coupling portion or section 18, and equally in relation to the annular or ring-shaped portion 23, so that the coupling portion 19 penetrates or enters the ring-shaped groove 28 of the rod 10 at one side thereof, as has been clearly shown in FIG. 4. At the same time the longitudinal or lengthwise slot 16 enlarges by a small amount, however not to such an extent that the intermediate region 25''', namely the part of the coupling part of member 14 which wraps about the upper portion of the rod 12 in FIG. 4, would no longer be elongated, even if only slightly. This elongation ensures that the force, to which the coupling portion 19 is exposed, not only exerts a lateral component but also a component directed towards the rod 12 and towards the bore 15, respectively. As a result, the coupling portion or section 19 not only laterally enters the ring-shaped groove 28 of the rod 10, but also presses the head 29 at the end of the rod 10 snugly into the blindhole bore 20. Hence, the rod 10 is now form-lockingly anchored in axial direction in the coupling part or member 13, whereas the rod 12 is force-lockingly or frictionally anchored in and throughout the entire length of the other coupling part or member 14.

To facilitate the insertion of the rod 10 into the coupling part 13, the head 29 can possess a conical bevel, as the same has been shown in broken lines at the lower portion of the illustration of FIG. 3.

It is also possible to anchor the rod 12 in the coupling part or member 14 with an axial form-locking connection. To this end, and as shown for instance in broken lines in FIG. 2, there can be formed or provided a form-locking element 30 at that side of the intermediate element 25 at which there comes to bear the rod 12 after the bending of such intermediate element 25 about this rod 12. It should be understood that, in this case, there also would be advantageously machined or otherwise formed at the rod 12 a profiled recess which is complementary to the form-locking element 30.

The described connection coupling or socket arrangement can be used in all those instances where rods or the like, having comparatively small transverse dimensions, are to be interconnected at an angle with respect to one another. This is, for instance, the case during the building of shelve frames or shelving formed of rod elements, during the building of grids or the like formed of rod elements, and also during the construction of bicycles, especially the luggage carriers thereof.

Accordingly, in the case of a pair of rods interconnected by means of a connection coupling of the type proposed according to the invention, the end of the first rod could be constituted by a support strut of a bicycle-luggage carrier, whereas the second rod could be constituted by a transverse strut of the load-carrying surface of the luggage carrier.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A connection coupling for the releasable attachment of an end of a first rod with a second rod, comprising:
   a first coupling part and a second coupling part;
   said first coupling part being arranged at an angle with respect to said second coupling part;
   said first coupling part being provided with a bore for receiving said first rod;
   said second coupling part being provided with a bore for receiving said second rod;
   the second coupling part being provided with a continuous longitudinal slot extending throughout the length of its bore;
   the second coupling part having first and second lateral edge regions defining an intermediate element therebetween and which lateral edge regions bound said continuous longitudinal slot;
   the first coupling part being divided transversely with respect to its bore into first and second coupling portions;
   said first lateral edge region supporting said first coupling portion of the first coupling part;
   said second lateral edge region supporting said second coupling portion of the first coupling part;
   said first coupling portion being situated closer to the lengthwise slotted second coupling part than said second coupling portion;
   each of the first and second coupling portions surroundingly defining parts of the length of said bore of the first coupling part;
   the first coupling portion being integrally formed directly at the first lateral edge region bounding the continuous longitudinal slot;
   the second coupling portion being integrally formed at the second lateral edge region; and
   an elastic web which is integral with the second lateral edge region and connected to said second coupling portion whereby said intermediate element elastically biases said portions of the length of the bore of the first coupling part defined by the first and second coupling portions thereof out of mutual axial alignment in a direction substantially perpendicular to said first rod.

2. The connection coupling as defined in claim 1, wherein:
   said lengthwise slotted second coupling part is elastically elongatable in its circumferential direction.

3. The connection coupling as defined in claim 1 or 2, wherein:
   said longitudinal slot extends essentially linearly in the lengthwise slotted second coupling part.

4. The connection coupling as defined in claim 1, wherein:
   a part of the bore provided at the first coupling portion comprises a blindhole bore.

5. A connection coupling for the releasable attachment of an end of a first rod with a second rod, comprising:
   a first coupling part and a second coupling part;
   said first coupling part being arranged at an angle with respect to said second coupling part;
   said first coupling part being provided with a bore for receiving said first rod;
   said second coupling part being provided with a bore for receiving said second rod;
   the second coupling part being provided with a continuous longitudinal slot extending throughout the length of its bore;
   the second coupling part having first and second lateral edge regions defining an intermediate element therebetween and which lateral edge regions bound said continuous longitudinal slot;
   the first coupling part being divided transversely with respect to its bore into first and second coupling portions;
   said first lateral edge region supporting said first coupling portion of the first coupling part;
   said second lateral edge region supporting said second coupling portion of the first coupling part;
   said first coupling portion being situated closer to the lengthwise slotted second coupling part than said second coupling portion;
   each of the first and second coupling portions surroundingly defining parts of the length of said bore of the first coupling part;
   the first coupling portion being integrally formed directly at the first lateral edge region bounding the continuous longitudinal slot;
   the second coupling portion being integrally formed at the second lateral edge region;
   an elastic web which is integral with the second lateral edge region and connected to the second coupling portion whereby said intermediate element elastically biases said portions of the length of the bore of the first coupling part defined by the first and second coupling portions thereof out of mutual axial alignment in a direction substantially perpendicular to said first rod;
   a part of the bore provided at the first coupling portion comprises a blindhole bore;

the first coupling portion carries a connection portion laterally protruding past the second coupling portion;

said connection portion having an end;

a ring-shaped portion provided at said end of said connection portion and engaging over the second coupling portion; and said ring-shaped portion having a bore which is essentially in alignment with said blindhole bore.

6. The connection coupling as defined in claim 1, wherein:

said lengthwise slotted second coupling part is flexible about bending axes extending essentially parallel to its bore.

7. A connection coupling for the releasable attachment of an end of a first rod with a second rod, comprising:

a first coupling part and a second coupling part;

said first coupling part being arranged at an angle with respect to said second coupling part;

said first coupling part being provided with a bore for receiving said first rod;

said second coupling part being provided with a bore for receiving said second rod;

the second coupling part being provided with a continuous longitudinal slot extending throughout the length of its bore;

the second coupling part having first and second lateral edge regions defining an intermediate element therebetween and which lateral edge regions bound said continuous longitudinal slot;

the first coupling part being divided transversely with respect to its bore into first and second coupling portions;

said first lateral edge region supporting said first coupling portion of the first coupling part;

said second lateral edge region supporting said second coupling portion of the first coupling part;

said first coupling portion being situated closer to the lengthwise slotted second coupling part than said second coupling portion;

each of the first and second coupling portions surroundingly defining parts of the length of said bore of the first coupling part;

the first coupling portion being integrally formed directly at the first lateral edge region bounding the continuous longitudinal slot;

the second coupling portion being integrally formed at the second lateral edge region;

an elastic web which is integral with the second lateral edge region and connected to said second coupling portion whereby said intermediate element elastically biases said portion of the length of the bore of the first coupling part defined by the first and second coupling portions thereof out of mutual axial alignment in a direction substantially perpendicular to said first rod;

a part of the bore provided at the first coupling portion comprises a blindhole bore; and the first coupling portion is surrounded by said elastic web defining a substantially bowl-shaped connection portion carrying at one end therof the second coupling portion.

8. The connection coupling as defined in claim 6, further including:

at least one form-locking element effective in axial direction provided in the bore of the lengthwise slotted second coupling part.

9. The connection coupling as defined in claim 1, wherein:

said connection coupling is formed of one-piece.

10. A connection coupling for the releasable attachment of an end of a first rod with a second rod, comprising:

a first coupling part and a second coupling part;

said first coupling part being arranged at an angle with respect to said second coupling part;

said first coupling part being provided with a bore for receiving said first rod;

said second coupling part being provided with a bore for receiving said second rod;

the second coupling part being provided with a continuous longitudinal slot extending throughout the length of its bore;

the second coupling part having first and second lateral edge regions defining an intermediate element therebetween and which lateral edge regions bound said continuous longitudinal slot;

the first coupling part being divided transversely with respect to its bore into first and second coupling portions;

said first lateral edge region supporting said first coupling portion of the first coupling part;

said second lateral edge region supporting said second coupling portion of the first coupling part;

said first coupling portion being situated closer to the lengthwise slotted second coupling part than said second coupling portion;

each of the first and second coupling portions surroundingly defining parts of the length of said bore of the first coupling part;

the first coupling portion being integrally formed directly at the first lateral edge region bounding the continuous longitudinal slot;

the second coupling portion being integrally formed at the second lateral edge region;

an elastic web which is integral with the second lateral edge region and connected to said second coupling portion whereby said intermediate element elastically biases said portions of the length of the bore of the first coupling part defined by the first and second coupling portions thereof out of mutual axial alignment in a direction substantially perpendicular to said first rod;

said first rod has an end provided with a circumferential groove; and said circumferential groove having a length essentially corresponding to the length of the second coupling portion of the first coupling part.

11. The connection coupling as defined in claim 10, wherein:

said first rod which is provided at its end with a circumferential groove comprises a support strut of a bicycle-luggage carrier; and said second rod comprises a transverse strut of a load-carrying surface of said luggage carrier.

* * * * *

UNITED STATES PATENT AND TRADEMARK OFFICE
CERTIFICATE OF CORRECTION

PATENT NO. : 4,484,832
DATED : November 27, 1984
INVENTOR(S) : HEINZ WEISSENBERGER It is certified that error appears in the above-identified patent and that said Letters Patent is hereby corrected as shown below:

Column 4, line 26, after "rod", delete "19" and replace it with --10--
Column 6, line 6, after "said", delete "portions" and replace it with --parts--
Column 6, line 62, after "said", delete "portions" and replace it with --parts--
Column 7, line 54, after "said", delete "portion" and replace it with --parts--
Column 8, line 47, after "said", deleete "portions" and replace it with --parts--

Signed and Sealed this

Ninth Day of April 1985

[SEAL]

Attest:

DONALD J. QUIGG

Attesting Officer

Acting Commissioner of Patents and Trademarks